(12) United States Patent
Benedek et al.

(10) Patent No.: US 12,343,682 B2
(45) Date of Patent: Jul. 1, 2025

(54) TIGHTLY SPACED FLAT SHEET IMMERSED MEMBRANES AND FINE BUBBLE AERATION

(71) Applicant: FIBRACAST LTD., Hannon (CA)

(72) Inventors: Diana Benedek, Rancho Santa Fe, CA (US); Babak Lakghomi, Hamilton (CA); David M. Turnbull, Burlington (CA)

(73) Assignee: FIBRACAST LTD., Hannon (CA)

( * ) Notice: Subject to any disclaimer, the term of this patent is extended or adjusted under 35 U.S.C. 154(b) by 541 days.

(21) Appl. No.: 17/255,534

(22) PCT Filed: Jul. 2, 2019

(86) PCT No.: PCT/CA2019/050910
§ 371 (c)(1),
(2) Date: Dec. 23, 2020

(87) PCT Pub. No.: WO2020/006628
PCT Pub. Date: Jan. 9, 2020

(65) Prior Publication Data
US 2021/0220776 A1     Jul. 22, 2021

Related U.S. Application Data

(60) Provisional application No. 62/693,617, filed on Jul. 3, 2018.

(51) Int. Cl.
*B01D 63/14* (2006.01)
*B01D 63/08* (2006.01)
*B01D 65/08* (2006.01)

(52) U.S. Cl.
CPC ......... *B01D 63/14* (2013.01); *B01D 63/0821* (2022.08); *B01D 63/0822* (2022.08);
(Continued)

(58) Field of Classification Search
CPC ...... B01D 63/082; B01D 63/14; B01D 65/02; B01D 65/08; B01D 2313/26;
(Continued)

(56) References Cited

U.S. PATENT DOCUMENTS

2008/0190849 A1* 8/2008 Vuong ............... B01D 63/084
                                                        210/170.11
2017/0095773 A1  4/2017  Tomescu
2019/0015788 A1  1/2019  Okamoto et al.

FOREIGN PATENT DOCUMENTS

CN     101293701 A    10/2008
CN     101678282 A     3/2010
(Continued)

OTHER PUBLICATIONS

WO2008038436A1—EPO Machine Translation (Year: 2023).*
(Continued)

*Primary Examiner* — Patrick Orme
(74) *Attorney, Agent, or Firm* — Borden Ladner Gervais LLP; Michael Damiani

(57) ABSTRACT

An immersed membranes uses aeration (air bubbles rising past the membranes) as a means to scour the membrane surface and keep it clean from solids, or foulants, allowing for continuous and effective operation. In a module of flat sheet membranes, fine bubble aeration is used to create and maintain space between the membrane sheets. The bubbles inhibit the sheets from touching and clogging together, thus reducing their surface area and their productivity. The aeration may be used for scouring, to supply oxygen to biomass and as a spacer to maintain the working surface area of immersed flat sheet membranes. The face-to-face spacing between the membrane sheets may be 4 mm or less. The bubbles may be less than twice the face-to-face spacing between the membrane sheets.

20 Claims, 8 Drawing Sheets

(52) U.S. Cl.
CPC .......... *B01D 65/08* (2013.01); *B01D 2315/06* (2013.01); *B01D 2321/185* (2013.01); *B01D 2325/08* (2013.01)

(58) Field of Classification Search
CPC .......... B01D 2315/06; B01D 2321/185; B01D 2325/08; C02F 3/201
See application file for complete search history.

(56) References Cited

FOREIGN PATENT DOCUMENTS

| | | | | | |
|---|---|---|---|---|---|
| CN | 107174960 | A | 9/2017 | | |
| EP | 0734758 | A1 | 10/1996 | | |
| JP | H07275668 | A | 10/1995 | | |
| JP | 2017080688 | A | 5/2017 | | |
| WO | WO-2008038436 | A1 | * | 4/2008 | .......... B01D 61/145 |
| WO | 2011130853 | A1 | 10/2011 | | |
| WO | 2017150531 | A1 | 9/2017 | | |

OTHER PUBLICATIONS

International Patent Application No. PCT/CA2019/050910, International Preliminary Report on Patentability dated Jan. 14, 2021.
International Patent Application No. PCT/CA2019/050910, International Search Report and Written Opinion dated Sep. 10, 2019.
Japanese Patent Application No. 20200573490, Office action dated Oct. 4, 2022—Original document Not available.
Chinese Patent Application No. 201980051143.6, Office Action and Search Report dated Jun. 29, 2022—English Translation Available.
European Patent Application No. 19830672.2, Extended European Search Report dated Feb. 28, 2022.
Japanese Patent Application No. 20200573490, Office action dated Jul. 18, 2023—English Translation Available.
Korean Patent Application No. 10-2021-7003259, Office Action dated Jun. 28, 2023—English Translation Not Available.
Australian Patent Application No. 2019298254, Examination Report dated May 30, 2024.
Japanese Patent Application No. 2020-573490, Office Action dated Apr. 2, 2024 (English Translation Available).
Japanese Patent Application No. 2020-573490, Office Action dated Mar. 22, 2024 (English Translation Available).
Korean Patent Application No. 10-2021-7003259, Office Action dated Jun. 26, 2024—English Translation Available.
Canadian Patent Application No. 3,104,749, Office Action dated Nov. 29, 2023.
Israel Patent Application No. IL279899, Office Action dated Dec. 12, 2023.
Korean Patent Application No. 10-2021-7003259, Office Action dated Dec. 12, 2023—English Translation Not Available.
Israel Patent Application No. IL279899, Office Action dated Dec. 1, 2024.
Korean Patent Application No. 10-2021-7003259, English Translation of Office Action dated Jun. 28, 2023.
Korean Patent Application No. 10-2021-7003259, English Translation of Office Action dated Dec. 12, 2023.
Japanese Patent Application No. 2020-573490, Office Action dated Apr. 18, 2025.—English translation attached.
European Patent Application No. 19830672.2, Office Action dated Mar. 26, 2025.

* cited by examiner

TIGHTLY SPACED FLAT SHEET IMMERSED MEMBRANES AND FINE BUBBLE AERATION

RELATED APPLICATIONS

This application claims the benefit of U.S. Provisional Application Ser. No. 62/693,617 filed on Jul. 3, 2018 which is incorporated herein by reference.

FIELD

This specification relates to immersed membranes, alternatively called submerged membranes, and methods of operating them.

BACKGROUND

The following is not an admission that anything discussed below is common general knowledge or citable as prior art.

Immersed filtering membranes may be made in a flat sheet, alternatively called plate and frame, configuration. In this configuration, a roll of membrane sheet is made by casting a polymeric separation layer cast onto a roll of non-woven substrate. Two generally rectangular pieces of membrane sheet are attached at their edges onto opposing sides of hollow plastic frame. This creates a panel with a hollow interior channel to collect filtered water, alternatively called permeate. Permeate is withdrawn by suction applied to the interior of the membrane. Several panels slide side by side into a frame that can be immersed in water to be filtered. The water to be filtered is typically held in an open tank. The insides of the panels are connected to the suction side of a pump to draw permeate through the membrane sheets. Bubbles provided from below the frame cause a mixed flow of bubbles and liquid to rise through vertical slots between the panels to held clean the membrane surfaces. Examples of this type of device are shown in U.S. Pat. Nos. 5,482,625; 5,651,888; 5,772,831; 6,287,467; and, 6,843,908, all owned by Kubota Corporation.

Flat sheet membrane modules are generally robust and have a low manufacturing cost per unit area (relative to hollow fiber membranes) because they can be cast in a wide sheet. However, conventional flat sheet membranes have poor packing densities (membrane surface area per unit volume of the module) relative to hollow fiber membranes.

A variation of a flat sheet membrane element is shown in International Publication Number WO 2007/036332 to Microdyn-Nadir GMBH. In these elements, two layers of membrane material are cast onto the front and back sides of a fabric having a porous central area between two dense layers. The central area provides a permeate channel and also connects the two dense layers together allowing the element to be backwashed for mechanical cleaning. These elements do not require a four-sided frame and they are about 2 mm thick, which is thinner than the plate and frame elements described above. However, these elements are also flexible and they are spaced apart by about 10 mm center to center in a frame. The packing density is better than for the plate and frame elements described above, but still much lower than a hollow fiber membrane module. Similar flat sheet membrane but with an integrated permeate channel are described in International Publication Number WO 2012/098130 and U.S. Pat. No. 7,862,718.

A corrugated flat sheet membrane is described in International Publication Number WO 2011/130853. Unlike the smooth sided flat sheet membranes described above, these membranes are made of two substrate sheets formed with a series of parallel depressions bonded together between the depressions. The depressions form permeate channels inside the membrane. US Publication Number 2017095773 describes a coarse bubble aerator and method of operating the corrugated flat sheet membranes.

Coarse bubble aerators have been used for many years as a means to keep the surface of immersed membranes clean, using the combined energy of the movement of the air, liquid and solids moving in a cross-flow mode to the membrane surface. Typical bubble diameters from coarse bubble diffusers ranges from 5 to 9 mm. Simon Judd, in *The MBR Book: Principles and Applications of Membrane Bioreactors for Water and Wastewater*, Elsevier Science, April 2011 summarized that, "Traditionally fine bubble diffusion has been used for biomass aeration and a separate coarse bubble aeration system applied for membrane scouring" (page 129) and that, "Membrane aeration is usually carried out using coarse bubble aeration because of the increased turbulence and hence shear force created" (page 130).

INTRODUCTION

The following introduction is intended to introduce the reader to the detailed description to follow and not to limit or define any claimed invention.

Modules of flat sheet membranes as described in International Publication Number WO 2011/130853 produced by the Applicant have been made with the membranes spaced very closely together (typically about 1.5 mm face-to-face spacing, but configurable to 2.2. mm and 3.8 mm spacings). In some cases, particularly at the 1.5 mm spacing, the membranes lose a significant amount of their permeability after only a few hours of operation. Attempts to restore permeability by backwashing the membranes every 5 to 10 minutes reduce the recovery rate of the module and in some cases, do not materially improve the apparent permeability.

The inventors believe that the apparent loss of permeability is actually caused by a loss in effective surface area. As the membrane sheets move, the centers of adjacent sheets can contact each other inside the module. After two membrane sheets contact each other, they may stick together. Suction applied to the insides of the membranes may help hold the membranes together but the inventors hypothesized that coarse bubbles where causing the contact problem. It is known that a large bubble deformed into a channel provides effective scouring. However, in the case of closely spaced apart flat sheet membranes, the coarse bubbles create large preferential pathways through the module by pushing some pairs of adjacent membrane sheets apart, which forces other pairs of adjacent membrane sheets together.

As described in more detail further below, using fine bubble aerators improves the permeability of a module with closely spaced apart sheets. The fine bubbles appear to disperse evenly among the membrane sheets without pushing adjacent pairs of sheets apart. Optionally, the fine bubbles may have a size less than 5 mm, or 4 mm or less, or 3 mm or less. Optionally, the fine bubbles may be up to about 100% larger, or up to about 50% larger, than the face-to-face spacing between membrane sheets. Optionally the bubble size may be about equal to the spacing between membrane sheets or more. The membrane sheets may be corrugated or otherwise textured or smooth sided. The membrane sheets may be arranged in a set of vertically oriented parallel planes. The spacing between the membrane sheets may be 4 mm or less, 3 mm or less, or 2 mm or less. Optionally, fine bubble diffusers may be oriented parallel with the membrane sheets. The diffusers may be located, for example, 10 mm to 300 mm, or 50 to 200 mm, below the membrane sheets.

DRAWINGS

DETAILED DESCRIPTION

Figure 1:
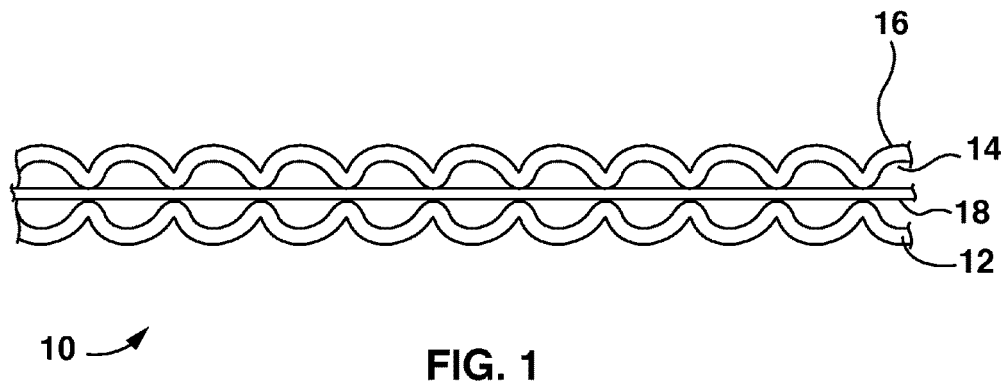
FIG. 1 shows an edge view of a membrane sheet.

Particularly in water containing over 0.1% of solids, water flow through an open tank without bubbles is not sufficient to maintain flux and membrane productivity. Most immersed membranes use coarse bubble aeration for scouring the membrane surface and thus maintaining flux. Coarse bubbles have enough energy to effectively scour the surface and are the standard choice of most membrane manufacturers. Fine bubble diffusers (i.e. diffusers with openings having an area less than the area of a 5 mm diameter circle) generate a very large quantity of small bubbles that are typically not as effective in scouring membrane surfaces. However, in the context of a flat sheet membrane module with closely spaced membrane sheets, fine bubbles are effective in maintaining permeability of the membranes.

Coarse bubble aeration is useful in some applications, but not effective in maintaining high flux with closely spaced membranes sheets in all applications. Without intending to be limited by theory, coarse bubbles may cause surface area to be lost due to the membranes touching. However, when using fine bubble air diffusers with a closely spaced membrane sheet array, optionally when the bubble size is not more than 100% more or 50% more than the distance between the membrane sheets, the membrane sheets remain separated. Optionally, the bubbles may have a size about equal to or larger than the spacing between the membrane sheets. The bubbles may act as separators or spacers between the sheets or at least do not push the sheets together. Substantially all of the membrane surface area remains active. The face-to-face spacing between the membrane sheets may be 4 mm or less, 3 mm or less, or 2 mm or less.

The immersed membrane sheets are closely spaced apart in the module. For example, the membrane sheets may have a face-to-face spacing of 4 mm or less, 3 mm or less, or 2 mm or less. The modules are placed in an open tank and permeate is withdrawn by suction. Bubbles from the fine bubble aerator rise between pairs of adjacent flat sheet membranes. The air bubbles may separate the sheets, scour the membranes and/or provide oxygen for biological uptake by microorganisms in the water.

An immersed membrane system includes a fine bubble aerator and a membrane module in combination. The fine bubble aerator may be any commercially available fine bubble aerator or custom made. The fine bubble aerator may be mounted under and/or between modules and/or cassettes of immersed membrane sheets. The fine bubble aerator is typically placed under the membrane module. The aerator is considered to be under the module if the bubbles are released below the bottom of the membranes, or within about 100 mm above the bottom of the membranes. However, the fine bubbles aerator is typically placed 10 to 300 mm, or 50 to 200 mm, below the bottom of the membrane sheets. A fine bubble aerator may have an elongated shape and, optionally, may be oriented parallel with the membrane sheets.

The membrane sheets are spaced closely together, for example with a vertically extending gap between then (i.e. a face-to-face spacing) of 4 mm or less, 3 mm or less or 2 mm or less or 1.5 mm or less. The fine bubble aerator is optionally configured and operated to produce bubbles having a size not more than 100% larger or 50% larger than the face-to-face spacing (i.e. vertically extending gap) between membrane sheets, optionally not larger than the spacing (i.e. vertically extending gap) between the membrane sheets. The bubble size may be assumed to be the diameter of a circle having an area equal to the area of an opening in the aerator that produces the bubbles. Alternatively, for example with the aerator is located more than 300 mm below the bottom of the lowest membrane, the bubbles size may be obtained by measuring bubbles at the bottom of a module, or the bottom of the lowest module in a cassette of vertically stacked modules, immersed in an open tank at a typical or nominal operating depth of submergence, or near this elevation, for example within 100 mm of it. The bubbles are typically generally one size, but bubble size may optionally be measured as the median or, preferably, the number average bubble size. The fine bubbles may be less than 5 mm in diameter, 4 mm or less in diameter, 3 mm or less in diameter, or 2 mm or less in diameter, optionally for modules with any face-to-face spacing between the membrane sheets of 4 mm or less, 3 mm or less or 2 mm or less.

The fine bubble aerators can be used to create space between sheets. The membrane sheets are closely spaced apart and could "kiss" or touch and blind without the use of the bubbles.

A fine bubble aerator may be installed under a single module or under a cassette containing multiple modules, for example vertically stacked modules. The membrane sheets are typically oriented vertically. Headers or other structural elements at the edges of the membrane sheets, if any, may be horizontal or vertical.

Using bubbles to create or maintain space between membrane sheets is preferred over adding physical spacers between the sheets. When membrane sheets are used to filter water with a high solids content, for example activated sludge in a membrane bioreactor, physical spacers would interfere with the free flow of solids or create eddies in the water flow. Physical spacers are likely to accumulate sludge deposits, which would then expand across the membrane sheet.

The effect of the fine bubbles is most noticeable when operating at higher fluxes, for example 18 GFD or more. The way to increase the flux in an immersed membrane is to increase the vacuum, which in turn may cause more sheets to remain in contact if they touch each other so that effective surface area is lost. Accordingly, preventing contact between membrane sheets with the fine bubbles may be more beneficial at higher flux.

The Figures show an example of a module with closely spaced membrane sheets and a fine bubble aerator.

FIG. 1 shows a membrane sheet 10. The membrane sheet 10 is made up of two substrate sheets 12 formed and bonded together to provide internal channels 14. The outsides of the substrate sheets 12 are coated with a porous separation layer 16. The separation layer 16 may have pores in the ultrafiltration or microfiltration range. A central sheet 18 between the two substrate sheets 12 is optional but may be added to provide a more rigid membrane sheet 10. Alternatively, a membrane sheet 10 may be a smooth faced flat sheet membrane. A smooth face flat sheet membrane may have, for example, an internal frame construction, an internal permeate spacer construction or an integrated permeate channel construction. A membrane sheet 10 may have pores in the microfiltration (MF) or ultrafiltration (UF) range.

Figure 2:
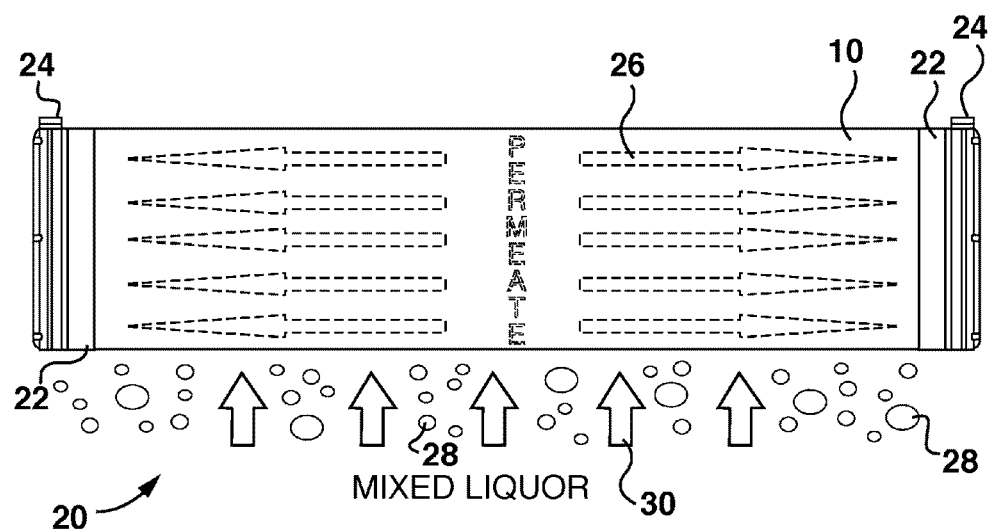
FIG. 2 shows an elevation view of a membrane module including a membrane sheet as in FIG. 1.

FIG. 2 shows a membrane module 20. The module 20 has one or more membrane sheets 10. The edges of the membrane sheets 10 that are open to the internal channels 14 (i.e. the edge shown in FIG. 1) are potted in headers 22, alternatively called potting heads or permeate collectors. When in use, the headers 22 are oriented generally vertically and the internal channels 14 are generally horizontal. Suction applied to permeate ports 24 of the headers 22 causes permeate 26 to be produced in the internal channels 14 and flow through the headers 22. A module 20 typically has multiple parallel membrane sheets 10. Adjacent membrane sheets 10 are separated by vertical gaps, typically of generally equal width. There is no sheet form feed side spacer, such as a mesh, between the membrane sheets 10. Preferably there is also no intermittent spacer, such as a set of vertical bars, between the membrane sheets 10. Preferably, the gaps between adjacent membrane sheets 10 are open.

When used in a membrane bioreactor (MBR), an open tank holding the module 20 is typically filled with mixed liquor according to an activated sludge process. The membrane module 20 and tank replaces the secondary clarifier. Bubbles 28 provided from below the module 20 help or cause mixed liquor 30 to flow upwards through the module 20, including through the gaps between adjacent membrane sheets 10.

Figure 3:
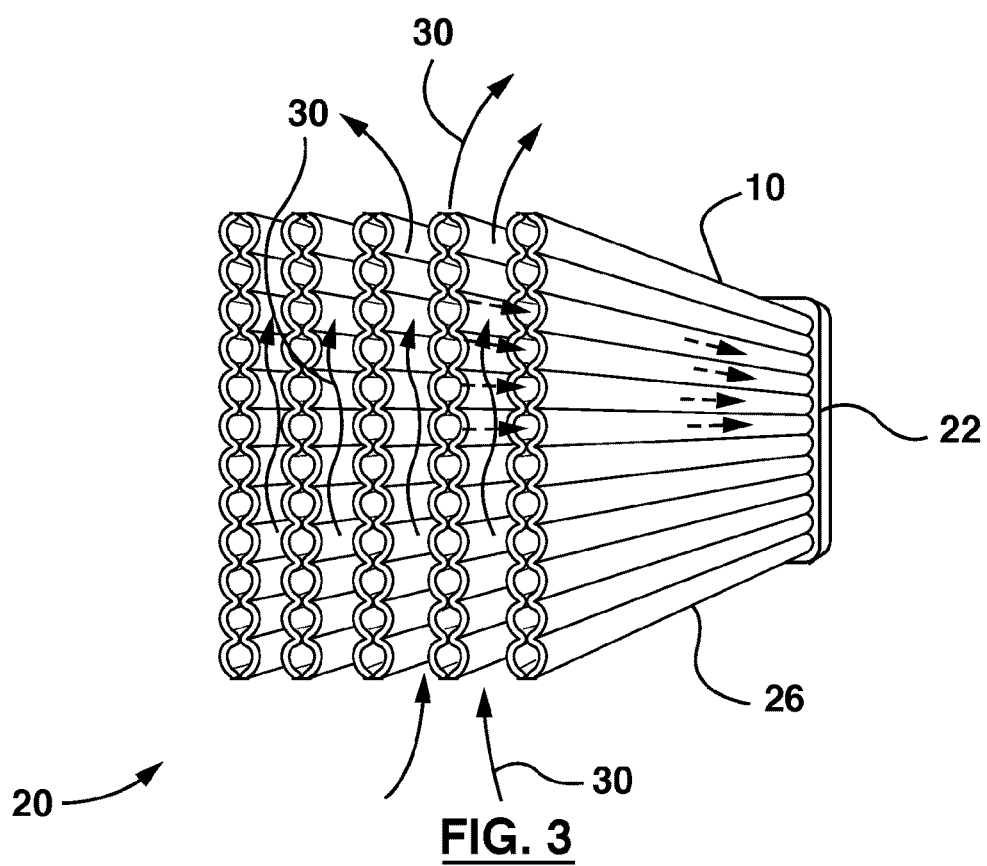
FIG. 3 is a schematic perspective view of a cut open module showing feed liquid and permeate flow directions.

FIG. 3 shows a schematic view of a module 20 cut open to further illustrate the flow of mixed liquor 30 (or another feed liquid) through the module 20. The undulating shape of the membrane sheets 10 creates turbulence in the mixed liquor 30 as it rises. The membrane sheets 10 vibrate as the mixed liquor 30 and bubbles 28 move between them. The bubbles 28 may provide some direct scouring of the membrane sheets 10 in addition to assisting or causing the mixed liquor flow.

Figure 4:
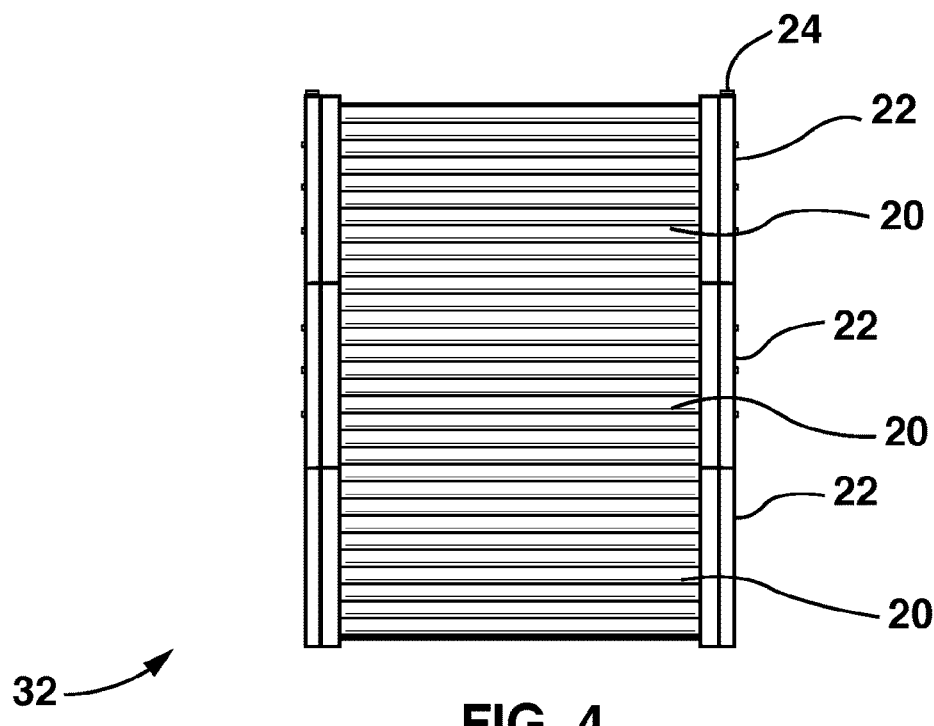
FIG. 4 shows an elevation view of three of the modules of FIG. 2 stacked together.

FIG. 4 shows a stack 32 of three modules 20. The modules 20 are stacked vertically on top of each other. The permeate ports 24 of a lower module fit into sockets (not visible) in the headers 22 of an upper module. The sockets in the lowest module 20 are plugged. The permeate ports 24 of the highest module can be connected to a permeate withdrawal pipe and used to withdraw permeate from all three modules 20. Stacks 32 may also be made with two, four or other numbers of modules 20. Since the headers 22 of adjacent modules are vertically aligned and continuous, feed liquid can flow vertically through the entire stack 32 without being impeded by the headers 22.

Figure 5:
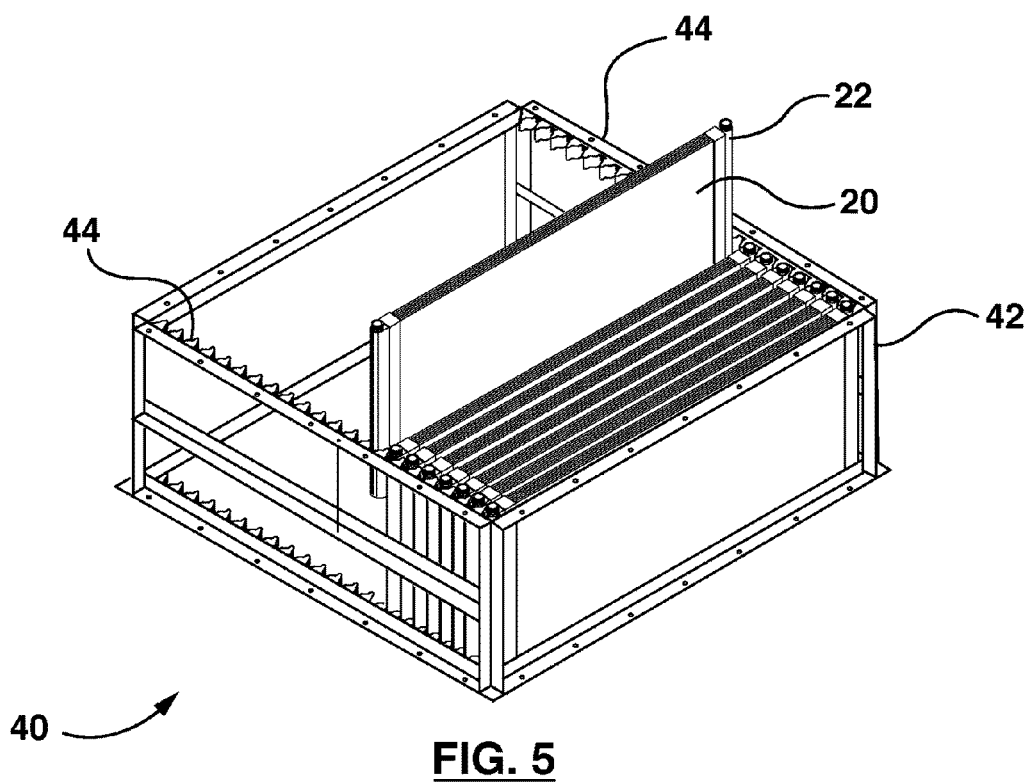
FIG. 5 is an isometric view of a block containing several of the modules of FIG. 2.

FIG. 5 shows a block 40 containing a plurality of modules 20 in a frame 42. The modules 20 are placed side by side in the frame 42. A module 20 may slide vertically into or out of the frame 42. When in the frame 42, the headers 22 of the module 20 fit into corresponding slots 44 provided, in the example shown, by plastic moldings attached to the frame 42.

Figure 6:
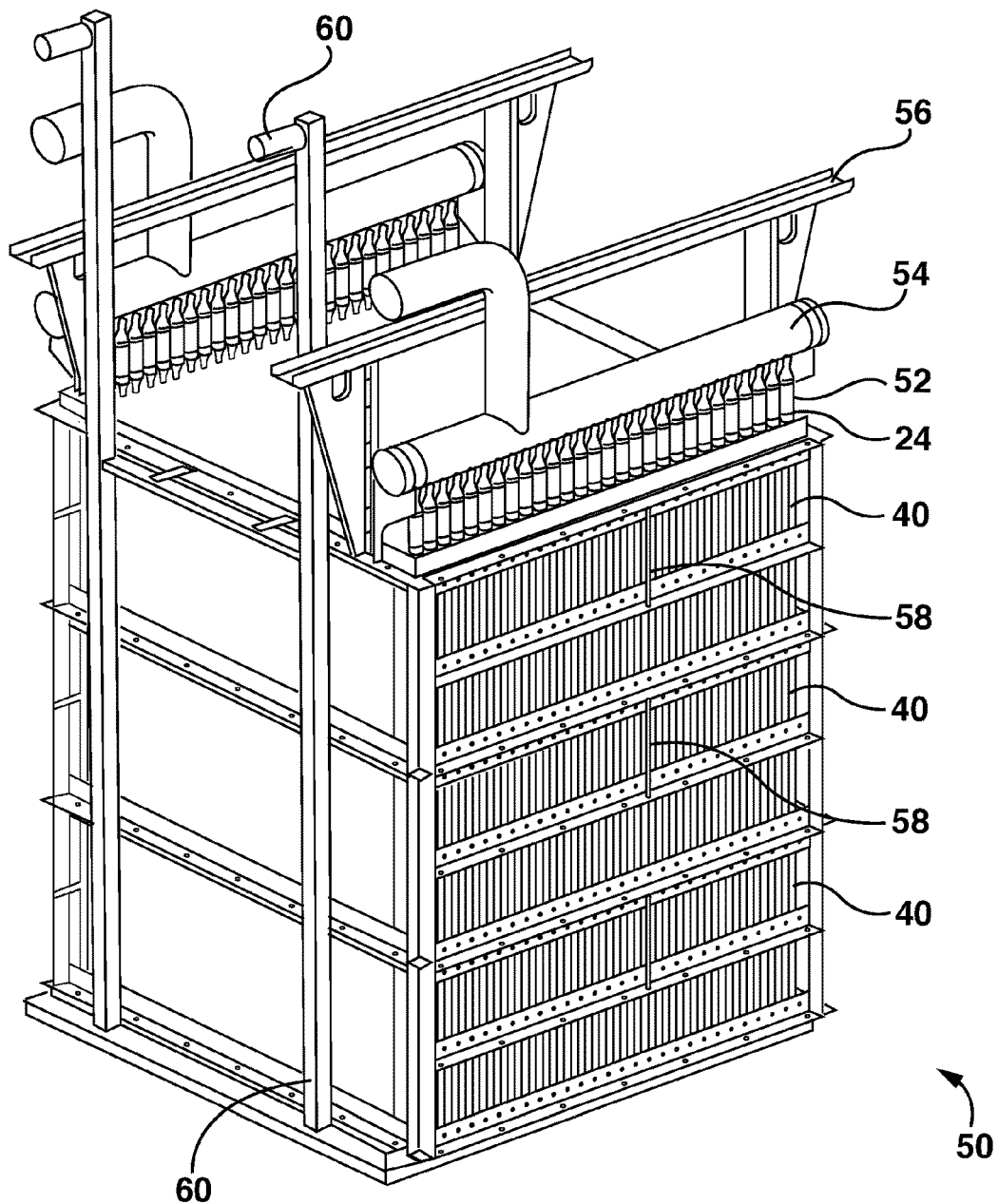
FIG. 6 is an isometric view of a cassette having three of the blocks of FIG. 5 stacked together.

FIG. 6 shows a cassette 50 made up of three blocks 40 stacked vertically together, one on top of the other. Optionally, a cassette 50 made have one, two, four or another number of bocks 40. The permeate ports 24 of the upper block 40 are connected to a permeate header pipe 54, optionally through connector pipes 52 as shown. The frames 42 of the blocks 40 are connected to each other by struts 58 that, in the example shown, are threaded rods with nuts on their ends. Struts 58 also attach the upper block 40 to a cassette frame 56, which may be used to hang the cassette 50 in a tank. Air supply pipes 60 bring air to the bottom of the cassette to be fed to a set of aerators (not visible) under the lowest block 40.

Figure 7:
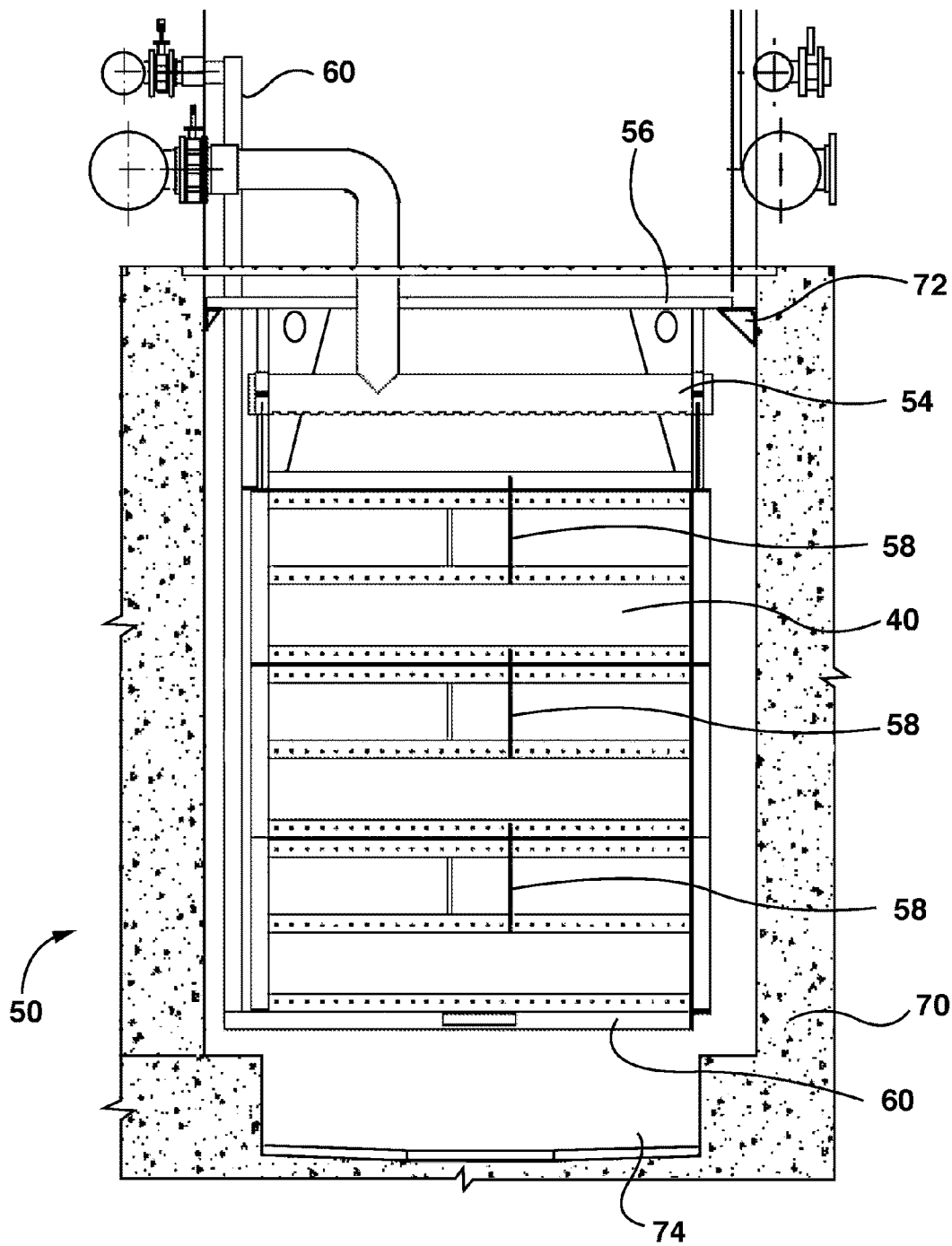
FIG. 7 is a section in elevation view of the cassette of FIG. 6 in a tank.

FIG. 7 shows a cassette 50 installed in a tank 70. The cassette frame 56 rests on the walls of the tank 70, in particular on ledges 72 attached to the tank 70 in the example shown. Alternatively, the cassette 50 can rest on the bottom of the tank 70, or the cassette 50 can be attached to a frame or other structure that rests on the bottom of tank 70.

The tank 70 optionally surrounds the cassette 50 closely as shown. Mixed liquor (or other feed liquid) is preferably fed into a channel 74 at the bottom of the tank 70 from one end of the tank and exits from a weir (not shown) at the top of the opposite end of the tank 70. This arrangement provides an average upwards flow of feed liquid through the modules 20. Multiple cassettes 50 can be spaced along the length of the tank 70 and combined to make a membrane train. A complete membrane system may have one or more trains.

The air supply pipes 60 extend horizontally below the cassette 50. The horizontal part of each air supply pipe 60 has a series of holes, one located below each vertical stack of 1-5 modules 20. A plurality of aerators (not visible in FIG. 7), preferably one for each vertical stack of modules 20, are attached to the frame 42 of the lowest block 40 and extend across the bottom of the cassette 50 perpendicular to and above the horizontal parts of the air supply pipes 60. The aerators are connected to the air supply pipes 60 below them. Each stack of modules 20 in the cassette 50 has one aerator below the lowest module 20 in the stack. The aerator is a pipe with a series of holes along its length covered by a perforated rubber sleeve. Air flows out of the holes and into the rubber sleeve. The pressure of the air forces the perforations in the rubber sleeve open allowing fine bubbles to be emitted. The openings in the rubber sleeve can have the area of a circle having a diameter in the range of 1-3 mm. Alternatively, the aerator may be a pipe with a series of holes in it. The holes may have the area of a circle with a diameter or less than 5 mm, for example between 2 and 4.5 mm.

Figure 8:
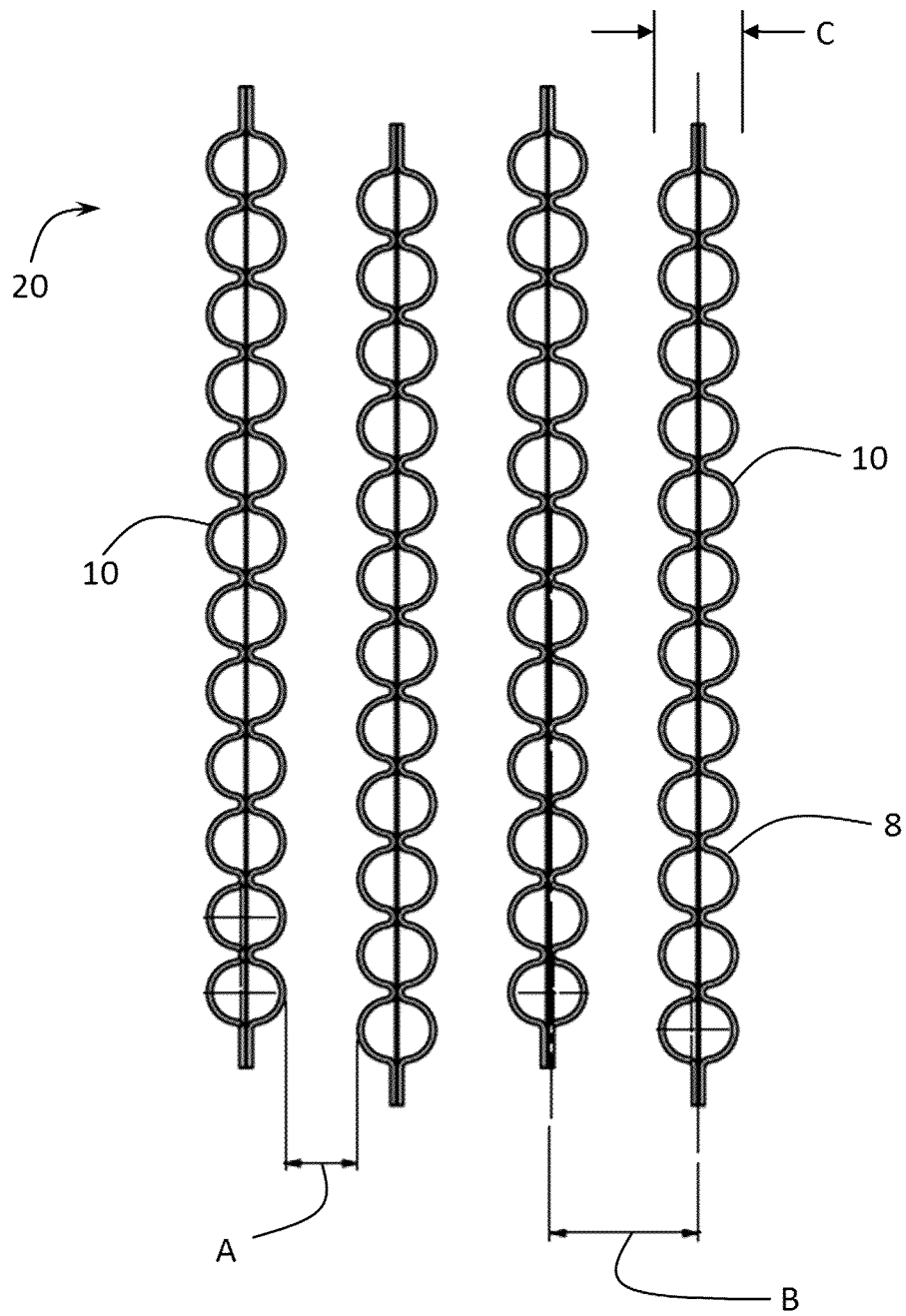
FIG. 8 is a cross-sectioned of a module showing the spacing and arrangement of membrane sheets.

FIG. 8 shows a set of membrane sheets 10 in a module 20. The membrane sheets 10 have depressions 8. The membrane sheets 10 have a width or thickness C. In the example shown, the thickness C is measured at the extremity of the regular surface features, which cover most of the membrane surface area. A smooth side flat sheet membrane has a width or thickness C that is generally constant throughout the sheet 10. The membrane sheets 10 also have a center-to-center spacing B.

The membrane sheets 10 have a face-to-face spacing A. Unless stated otherwise, any reference to spacing herein, or to the membrane sheets being spaced apart or other similar statements, refers to the face-to-face spacing. Spacing A is equal to the center-to-center spacing B minus the width C. As shown in FIG. 8, adjacent sheets 10 can be arranged with the depressions 8 offset from each other vertically, for example by half of the vertical distance between adjacent depressions 8 in a sheet 10. The membrane sheets are spaced closely together, for example with a spacing A of 4 mm or less, 3 mm or less or 2 mm or less.

EXAMPLES

A corrugated flat sheet module similar to the module 20 described herein with 1.5 mm spacing between membrane sheets, was operated with a coarse bubble aerator and a fine bubble aerator, at air flow rates of 0.005 and 0.01 standard cubic feet per minute (scfm). The coarse bubble aerator produced bubbles larger than 4 mm. The term "coarse" is used in this example relative to the module spacing and not according to typically industry use of the term. The fine bubble aerator produced bubbles smaller than 3 mm. Bubble size was measured below the bottom of the module 20, in particular in a space between the top of the aerator and 5 cm above the top of from the aerator. Suction on the inside of the membranes was varied to produce a range of flux values. Permeability was measured at the different flux values.

Figure 9:
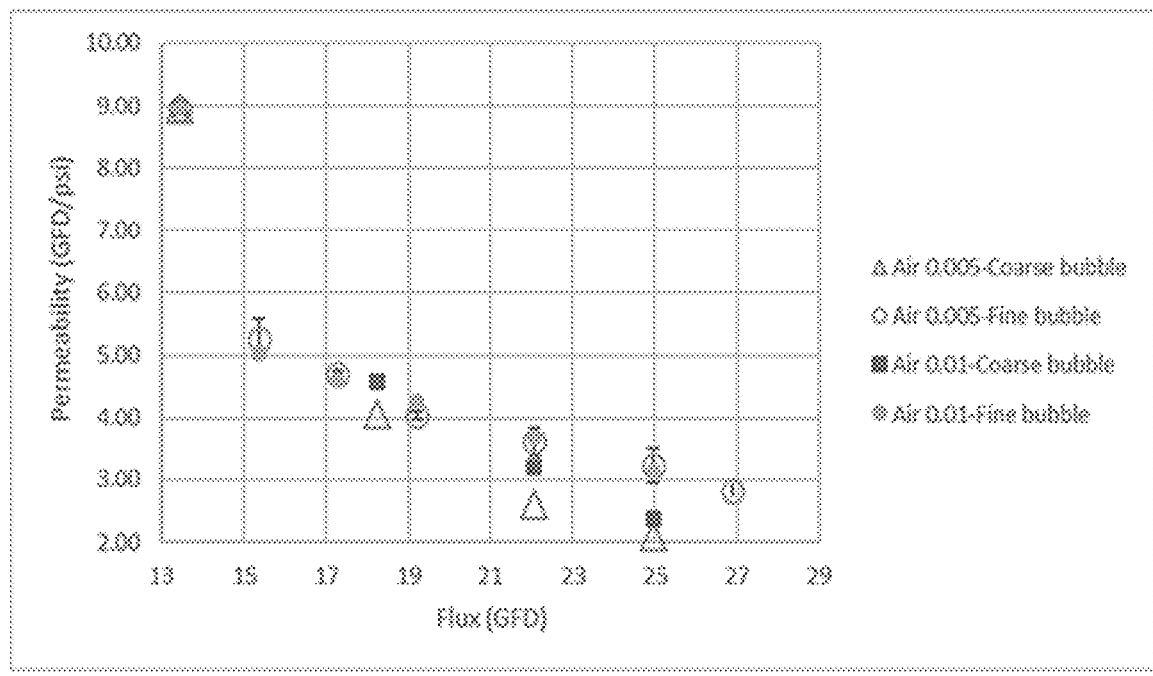
FIG. 9 is a graph of permeability studies comparing coarse and fine bubble aerators at various flux and aeration levels.

FIG. 9 shows typical results obtained with both aerators. The permeability of the membrane was higher with the fine bubble aerator, particularly at higher fluxes. The results also show that the membrane performs well with the fine bubble aerator even at the lower air flow rate. Membrane permeability was essentially the same when the fine bubble aerator was operated with either 0.005 or 0.01 scfm of air, independent of the flux. Membrane permeability with the fine bubble aerator operating with 0.005 scfm of air was typically the same as, or better, than membrane permeability at the same flux with the coarse bubble aerator operating with 0.01 scfm of air, suggesting a significant energy savings with the fine bubble aerator.

Figure 10:
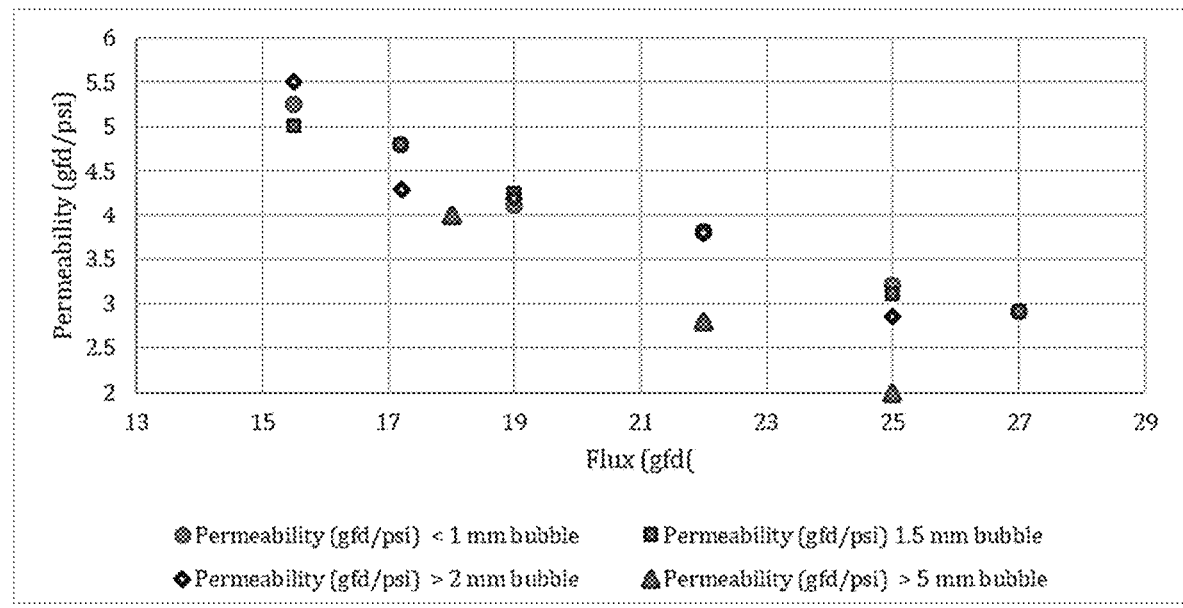
FIG. 10 is a graph of permeability studies showing the effect of bubble size on permeability.

Additional tests with the same module were conducted with bubbles of four sizes: less than 1 mm; 1.5 mm; over 2 mm; and, over 5 mm, by average diameter. The FiberPlate module has a sheet spacing of 1.5 mm. The module was operated at various flux values, and the permeability was measured. As indicated in FIG. 10, the permeability with a size of about 2 mm or less (i.e. 1-2 mm) performed significantly better than the 5 mm bubbles. Bubbles with a size of 1.5 mm performed well more consistently than bubbles with a size of about 2 mm.

Additional tests were conducted with three similar modules configured with face-to-face spacings of 1.5 mm, 2.2 mm and 3.8 mm. The modules were operated in a bentonite suspension of 3.7 g/L, in a tank with a recirculating flow approximating a 4Q recirculation of return activated sludge (RAS) in a membrane bioreactor, with air provided at 0.006 scfm/ft² of membrane surface area. Bubbles were provided from diffusers located about 150 mm below the bottom of the membranes. One diffuser was a rubber sleeve type fine bubble diffuser with nominal (i.e. equivalent circle diameter) opening size of 2 mm. Another diffuser had 4 mm diameter holes.

Table 1 shows the TMP increase (psi/minute) while operating at a flux of 18 GFD with different combinations of face-to-face spacing and bubble size. The results in Table 1 suggest that, particularly with a very close face-to-face spacing of 3 mm or less, good results are obtained with bubbles having a size of 1 to 2 times the face-to-face spacing.

TABLE 1

| Face-to-Face Spacing (mm) | TMP increase (psi/min) with 2 mm bubbles | TMP increase (psi/min) with 4 mm bubbles |
|---|---|---|
| 1.5 | 0.029 | 0.037 |
| 2.2 | 0.061 | 0.020 |
| 3.8 | 0.048 | 0.135 |

Although the detailed description and examples herein are based on corrugated flat sheet modules, it is expected that similar results would be achieved with smooth-side flat sheet modules. It is also expected that any specific process condition or physical dimension in a specific example can be varied by about 50% in either direction.

International Publication Number WO 2011/130853 and US Publication Number 2017095773 are incorporated herein by reference.

The invention claimed is:

1. An immersed membrane filtration unit comprising, a module of membranes, each membrane comprising at least two sheets of substrate material bonded together, wherein at least one of the sheets of substrate material has depressions defined by its inner surface and ridges defined by its outer surface, the depressions extending to an edge of the at least one of the sheets of substrate material, wherein the flat sheet membranes have a face-to-face spacing between the membranes of 4 mm or less; and, a fine bubble aerator below the membranes, wherein the fine bubble aerator is configured to produce bubbles having a size of 4 mm or less, 3 mm or less, or not more than 100% more or 50% more than the face-to-face spacing between the membranes, and wherein the fine bubble aerator has one or more openings having a diameter of about 5 mm or less.

2. The immersed membrane filtration unit of claim 1 wherein the fine bubble aerator is configured to produce bubbles having a size of 2 mm or less, or not more than the face-to-face spacing between the membranes.

3. The immersed membrane filtration unit of claim 1 wherein the face-to-face spacing between the membranes is 3 mm or less, 2 mm or less, or 1.5 mm or less.

4. The immersed membrane filtration unit of claim 1 wherein the face-to-face spacing between the membranes is 3 mm or less.

5. The immersed membrane filtration unit of claim 1 wherein the face-to-face spacing between the membranes is 2 mm or less, and the fine bubble aerator has openings of 3 mm or less in diameter.

6. The immersed membrane filtration unit of claim 1 wherein each membrane has two faces that have depressions.

7. The immersed membrane filtration unit of claim 6 wherein the depressions of adjacent membranes are at different elevations.

8. The immersed membrane filtration unit of claim 1 wherein the face-to-face spacing between the membranes is about 1.5 mm, and the fine bubble aerator is configured to produce bubbles having a size of about 4 mm.

9. The immersed membrane filtration unit of claim 1 wherein the two sheets of substrate material are bonded together along one or more lines between the depressions, whereby the depressions form undivided internal permeate channels between the two sheets of substrate material.

10. A process of filtering water comprising the steps of,
immersing a module of membranes in the water, each membrane comprising at least two sheets of substrate material bonded together, wherein at least one of the sheets of substrate material has depressions defined by its inner surface and ridges defined by its outer surface, the depressions extending to an edge of the at least one of the sheets of substrate material, wherein the module has a face-to-face spacing between the membranes of 4 mm or less; and, producing bubbles below the membranes using a fine bubble aerator having one or more openings of about 5 mm or less, wherein the bubbles have a size of 5 mm or less or 3 mm or less or not more than 100% more or 50% more than the face-to-face spacing between the membranes.

11. The process of claim 10 wherein the bubbles have a size of 2 mm or less or not more than the spacing between the membranes.

12. The process of claim 10 wherein the spacing between the membranes is 3 mm or less, 2 mm or less, or 1.5 mm or less.

13. The process of claim 10 wherein the face-to-face spacing between the membranes is 3 mm or less, and the bubbles have a size of 5 mm or less in diameter.

14. The process of claim 13 wherein the face-to-face spacing between the membranes is about 2.2 mm.

15. The process of claim 10 wherein the face-to-face spacing between the membranes is 2 mm or less, and the bubbles have a size of 3 mm or less in diameter.

16. The process of claim 15 wherein the face-to-face spacing between the membranes is about 1.5 mm.

17. The process of claim 10 wherein each membrane has two faces that have depressions.

18. The process of claim 17 wherein the depressions of adjacent membranes are at different elevations.

19. The process of claim 10 wherein the face-to-face spacing between the membranes is about 1.5 mm, and the bubbles have a size of about 4 mm.

20. The process of claim 10 wherein the two sheets of substrate material bonded together along one or more lines between the depressions, whereby the depressions form undivided internal permeate channels between the two sheets of substrate material.

* * * * *